Nov. 8, 1966   C. S. MERTLER   3,284,600
ELONGATED THERMOSTATIC CONTROL
Filed July 9, 1964
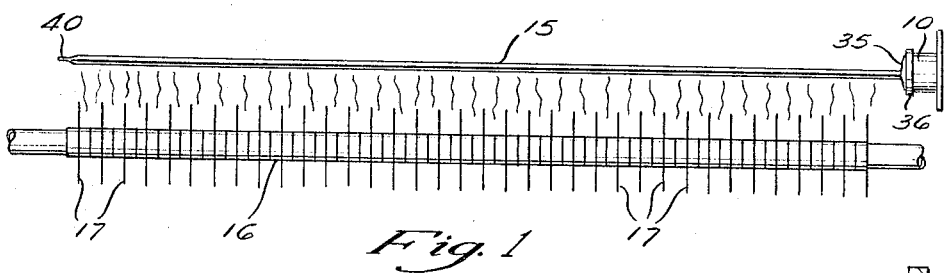
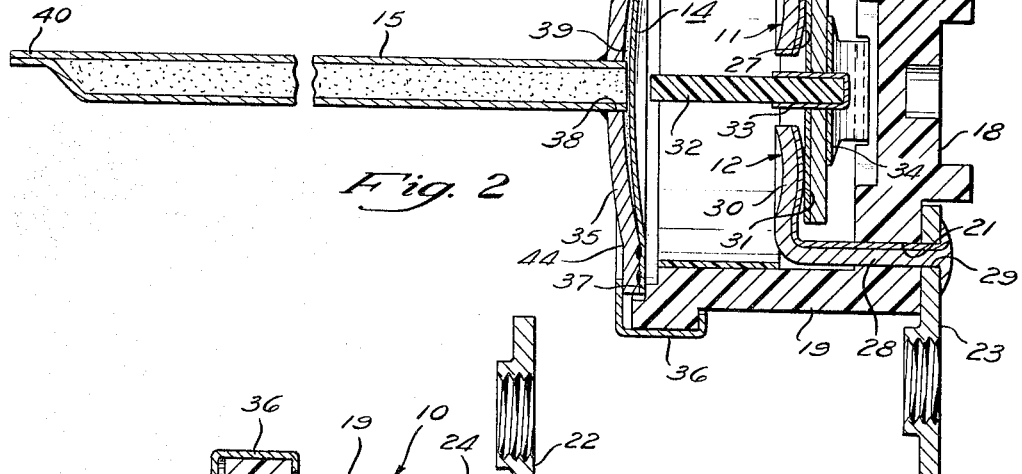
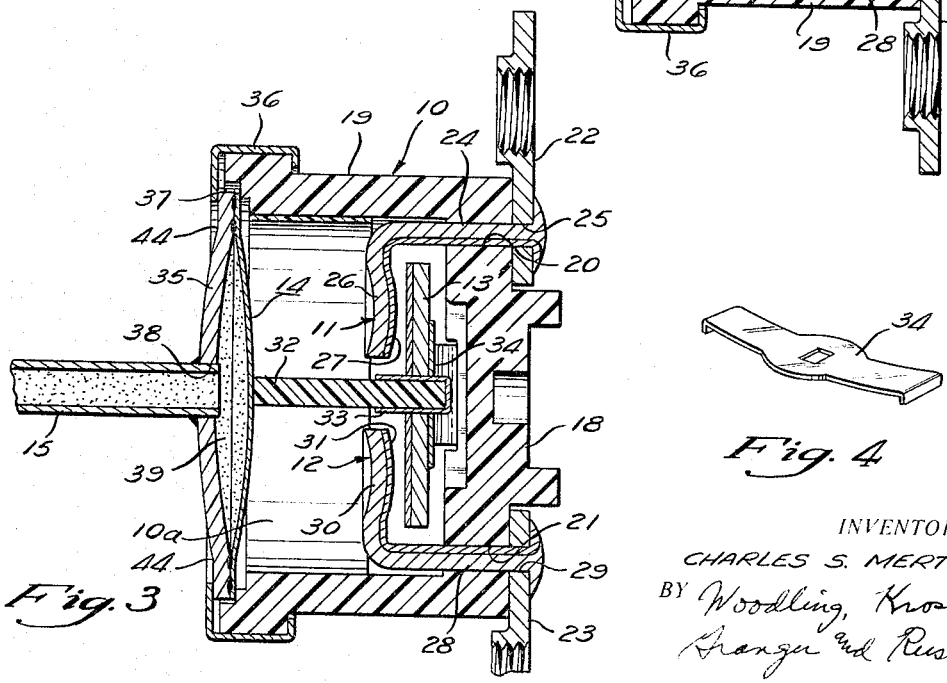
INVENTOR.
CHARLES S. MERTLER
BY Woodling, Krost, Granger and Rust
ATTORNEYS

United States Patent Office 3,284,600
Patented Nov. 8, 1966

3,284,600
ELONGATED THERMOSTATIC CONTROL
Charles S. Mertler, Mansfield, Ohio, assignor to Stevens Manufacturing Company, Inc., a corporation of Ohio
Filed July 9, 1964, Ser. No. 381,420
6 Claims. (Cl. 200—140)

This invention relates to a thermostatic control for use with a baseboard heater or the like.

Baseboard heaters have come into widespread use, particularly for residential heating. Typically, such heaters comprise an elongated, horizontal steam or hot water pipe with fins thereon, or an electric heater, inside a horizontally elongated housing having an air inlet at the bottom and openings at the top for passing heated air to heat the room by convection. Such heaters may become fire hazards if the air outlet openings are blocked, for example, by window drapes hanging down over the heater in such a way as to block the escape of the heated air from the heater housing. To safeguard against this potential hazard, various arrangements have been proposed heretofore in which individual thermostats are located at closely spaced intervals along the length of the heater to detect overheating at any point along the heater. Such prior arrangements are relatively expensive and complex because of the number of individual thermostats involved.

The present invention relates to a novel thermostatic control which requires only a single thermostat but yet is able to detect overheating at any portion along the entire length of such a heater.

Accordingly, it is a principal object of this invention to provide a novel and improved thermostatic control which is adapted to detect overheating at any point along an elongated heater, such as a baseboard heater.

Another object of this invention is to provide such a thermostatic control which has a fail-safe operation.

Another object of this invention is to provide such a thermostatic control which includes an elongated capillary tube filled with a heat-expandable fluid under partial vacuum and adapted to extend along the entire length of the heater, and a thermostatic switch including a snap-acting diaphragm subjected to the fluid pressure in the tube and adapted to snap over to open the switch when the fluid pressure inside the tube increases as a result of overheating of the heater.

Other objects and a fuller understanding of the invention may be had by referring to the following description and claims, taken in conjunction with the accompanying drawings, in which:

FIGURE 1 illustrates schematically in elevational view a baseboard heater and the present thermostatic control arranged to respond to overheating of this heater;

FIGURE 2 is a longitudinal section of the thermostatic switch and the capillary tube which constitute the thermostatic control of the present invention, the tube being broken along its length to permit enlargement of the scale of this figure and the switch being shown in the condition which it assumes when the heater is not overheated;

FIGURE 3 is a view similar to FIGURE 2, but showing the thermostatic switch in the condition which it assumes when the capillary tube has become overheated;

FIGURE 4 is a perspective view of the bias spring embodied in this thermostatic switch; and, FIGURE 5 is a sectional view through the diaphragm before mounting in the thermostatic switch.

Referring to FIGURES 2 and 3, the thermostatic control of the present invention which is illustrated therein comprises a thermostat housing or base 10, switch contact means in the housing constituted by a pair of spaced fixed contacts 11 and 12 and a mobile contact 13 for bridging engagement with the fixed contacts, a snap-acting concavo-convex diaphragm 14 for operating the mobile contact in one direction, and an elongated capillary tube 15 connected at one end to the housing 10 and closed at its opposite end.

As shown in FIGURE 1, the capillary tube 15 is adapted to extend in heat-receiving relationship such as convection heating to a heater shown as an elongated, horizontal baseboard heater, which may comprise a steam or hot water pipe 16 having heat-radiating fins 17, or an electric heater. The capillary tube may be out of direct physical engagement with the heater, but it is in the path of heated air along the entire length of the heater, as explained hereinafter.

The thermostat housing 10 comprises a generally cup-shaped body having an end wall 18 and an annular side wall 19 connected thereto and providing therewith a switch chamber 10a. Preferably, this housing body is of plastic or other suitable dielectric material. The end wall 18 of the housing body presents a pair of laterally spaced openings 20 and 21. Terminal plates 22 and 23 of brass or other suitable electrically conductive metal extend across these openings.

The first fixed contact 11 of the switch is generally L-shaped in cross-section, presenting a longitudinal leg 24 which extends snugly through the opening 20 and through an opening 25 in the terminal 22 into the interior of the housing body at one side and a laterally inturned leg 26 which presents a convex contact surface 27. Preferably, this contact is of silver-laminated bronze. The outer end of its longitudinal leg 24 is flattened or riveted over into tight, electrically conductive engagement with the outside face of terminal 22.

The second fixed contact 12 of the switch is identical to the first, presenting a longitudinal leg 28 which extends snugly through opening 21 and through an opening 29 in terminal 23 into the interior of the housing body at the opposite side and a laterally inturned leg 30 which presents a convex contact surface 31. The outer end of the longitudinal leg 28 of this contact is similarly flattened against its terminal 23.

The mobile contact 13 is a flat plate, preferably of silver-laminated bronze, which is in confronting relation to both fixed contact surfaces 27 and 31 and is adapted to bridgingly engage those contact surfaces to complete a circuit between terminals 22 and 23.

An elongated stem or operating button 32 is rigidly attached to the mobile contact 13. This operating button passes between the adjacent ends of the laterally spaced, fixed contacts 11 and 12. The operating button is of hardened plastic or other suitable dielectric material. In the immediate vicinity of the switch contacts it has a copper layer 33 which constitutes an arc shield.

A bowed spring 34 (FIGURE 4) is engaged under compression between the mobile contact 13 and the end wall 18 of the housing body. This spring biases the mobile contact 13 into engagement with both fixed contacts 11 and 12, as shown in FIGURE 1.

The thermostat housing also includes a concavo-convex support plate 35 closing the opposite end of the housing body 10 from the latter's end wall 18. This support plate is without an external stiffening flange and is convex outwardly (to the left in FIGURES 2 and 3). A retainer ring 36, attached to the housing body, holds this support plate in place.

The snap-acting diaphragm 14 is of resilient metal and is welded around its entire periphery to the inside face of the support plate 35. At its periphery it engages an outwardly-facing, internal, annular shoulder 37 on the housing body. This diaphragm is so formed as to have a snap action in both directions and is normally bowed to the right in FIGURES 2 and 3. That is, normally the middle of the diaphragm is convex to the right. In this position, as shown in FIGURE 3, the middle of the diaphragm engages the operating button 32 and displaces the latter to the right, to a position where it holds the mobile contact 13 retracted away from engagement with the fixed contacts 11 and 12.

FIGURE 5 shows the diaphragm 14 before its assembly into the thermostat. The outer peripheral wall 41 is held planar and the central area 42 is slightly drawn to a concavo-convex position. Upon release of the peripheral wall 41, it assumes a slight angular position, such as about three degrees, relative to the plane of the diaphragm, as illustrated in FIGURE 5. The diaphragm 14 thus has an inherent snap action and will snap to the opposite concavo-convex position upon application of an axial force. The diaphragm 14 is like an oil can bottom, however, and will snap return to the position shown in FIGURE 5 upon release of the force. Upon welding the diaphragm 14 to the support plate 35, the peripheral wall 41 will again be forced to assume a planar position, and this will slightly increase the bulge of the central area 42.

The elongated capillary tube 15 is soldered at one end to the support plate 35 at a central opening 38 in the latter. This end of the tube is open and in fluid communication with the space 39 between the support plate 35 and diaphragm 14. The opposite end 40 of the tube is pinched closed and soldered. The capillary tube 15 in one practical embodiment is of uniform inside diameter throughout its entire length. The tube 15, the support plate 35 of the thermostat housing, and the diaphragm 14 sealed around its periphery to plate 35 together define a fluid-tight chamber constituted by the interior of tube 15 and the aforementioned space 39.

The interior of the capillary tube 15 and the space 39 is filled with a suitable compressible and expandable, heat-responsive fluid, preferably in a liquid state, such as freon, alcohol or ether. The thermal fluid is under partial vacuum. During manufacture, the tube 15 and space 59 may be filled completely full of liquid, with the diaphragm mechanically depressed. The end 40 of the tube is then sealed, and the diaphragm released. The inherent bias on the diaphragm tending to move it away from the support plate 35 establishes a partial vacuum on the liquid.

When the fluid is a liquid, the liquid may have a characteristic of turning from a liquid to a gas at a predetermined temperature and pressure. This liquid would be selected for the proper temperature of operation of the thermostat for use with the heater 16. The liquid, when in a liquid state, would have a predetermined coefficient of expansion which might be linear for example. When this same liquid vaporizes and turns to a gas, the gas would have a much greater coefficient of expansion. Accordingly, the transition from the liquid to the vapor state will cause a rapidly increasing change in volume to actuate the thermostat at the predetermined temperature. In one practical embodiment of the fluid being a gas, the fluid pressure inside the tube is about ⅓ of normal atmospheric pressure at an ambient temperature of about 70 degrees F. Under either of these conditions, the pressure differential on opposite sides of the diaphragm 14 is sufficient to maintain the latter bowed to the left, as shown in FIGURE 2, overcoming the inherent spring bias of the diaphragm to the right. In this position, the diaphragm is held retracted away from the operating button 32 and the bias spring 34 positions the mobile contact 13 in bridging engagement with the fixed contacts 11 and 12.

When the temperature to which the capillary tube 15 is exposed increases, the thermal fluid inside the tube heats up and consequently increases in pressure. At some particular temperature the pressure inside tube 15 and the space 39 will have increased to a point such that the pressure differential on opposite sides of the diaphragm 14 will be insufficient to overcome the inherent spring bias of the diaphragm to the right. Therefore, the diaphragm will snap over to the right to the position shown in FIGURE 3, where it has moved the operating button 32 sufficiently far to the right to disengage the mobile contact 13 from the fixed contacts 11 and 12. In one practical embodiment this snap action movement of the diaphragm takes place when the fluid pressure inside tube 15 has risen to about ⅔ of normal atmospheric pressure.

The construction of the support plate 35 and diaphragm 14 permits ready change of the calibrated temperature of operation. This would not be possible if the support plate 35 has a stiffening flange around the periphery. During manufacture, after the diaphragm 14 is welded to the support plate 35 and the tube filled and sealed there is a partial vacuum therein, because the diaphragm inherently tries to move to the right (FIGURES 2 and 3) but is restrained by the atmospheric pressure acting on the right side of the diaphragm 14. The elevated temperature at which the diaphragm 14 will snap to the right, as shown in FIGURE 3, may be changed by bending the support plate. This may be done in a press, for example, having annular rings to bear on the diaphragm and on the support plate 35. If the outer peripheral edge of the support plate 35 is pressed to the right relative to the circular line 43 on the diaphragm 14, this will strengthen the diaphragm and require a stronger vacuum to pull the diaphragm in to the position of FIGURE 2 and a stronger vacuum at the release point of opposite snap over. Conversely, if the outer peripheral edge of the diaphragm 14 is pressed to the left relative to the circular line 44 on the support plate 35, this will weaken the diaphragm and require a lower vacuum to pull the diaphragm to the position of FIGURE 2 and a lower vacuum at the release point of opposite snap over. By this means the temperature at which the thermostat will snap over may be adjusted up or down.

In the use of this thermostatic control, the elongated capillary tube 15 is positioned with relation to the heater 16, 17 such that convection air currents from the heater flow past the tube. As long as the convection flow of heat is normal, the temperature inside the tube will be such that the fluid pressure therein will be sufficiently low to hold the diaphragm 14 in the FIGURE 2 position.

However, if the convection heat flow from the heater is blocked along any significant length of the heater, such as by a drapery overlying the air outlet openings of the heater housing, then this section of the tube will become overheated because the heated air cannot readily escape. The fluid pressure inside the capillary tube 15 then will increase sufficiently to enable the diaphragm 14 to snap over to the FIGURE 3 position, opening the switch. In this manner, the present thermostatic control acts as a safety device to shut off the heater in the event of overheating anywhere along the length of the heater.

The baseboard heater to be controlled may have a length of six feet, for example. A current test required by United Laboratories for approval of such thremostatically controlled baseboard heaters is that if a drape or something blocks off the convection air flow in a six inch length of this total six foot length of the heater, then the thermostatic control must be able to shut off the heater. A prior art form of control was to use individual thermostatic switches positioned every six inches along the length of the heater and connected in series with these switches being normally closed. However, this would require a total of twelve individual thermostatic switches for adequate control of this heater. The present elongated tube type of thermostatic control is sufficiently sensitive to shut off the heater by actuation of the thermostatic switch upon a blocking of the convection heat flow from only a six inch length of a six foot long baseboard heater.

The thermostatic control of the invention provides a continuous thermostatic element as distinguished from discrete thermostatic elements along the length of a heater to be protected. It will be noted that in the embodiment disclosed, the diaphragm is shown as being snap acting and the switch is biased normally closed by the spring 34 and hence this shows that one of the diaphragm and the switch is a snap acting device.

The particular arrangement shown and described has a fail-safe characteristic. If the capillary tube 15 leaks, or if it is accidentally cut open, the diaphragm will snap over to the "off" position shown in FIGURE 3. That is, the inherent spring bias of the diaphragm is such that it will move to the off position if the interior of the tube 15 is not under the correct partial vacuum.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed. For example, if desired, the diaphragm 14 could be constructed to have a resilient self-bias away from the operating button 32, so that an above-atmospheric fluid pressure in tube 15 would be required to snap the diaphragm over to open the switch contacts. However, such an arrangement would not have a fail-safe operation and is considered to be less desirable for that reason.

What is claimed is:

1. A thermostatic control device for a heat source, comprising, a base, a switch carried on said base,
a diaphragm positioned on said base to act on said switch,
an enclosed chamber positioned in temperature sensing relationship to the heat source,
a fillant of heat expansible fluid under less than atmospheric pressure in said enclosed chamber at a predetermined normal temperature,
said fillant acting on said diaphragm to cause same to move in one direction to actuate said switch to one condition upon increase in temperature of said fillant,
and normal atmospheric pressure acting on one side of said diaphragm to normally maintain said diaphragm in the opposite direction to actuate said switch to the opposite condition.

2. A thermostatic control device for a heater, comprising, a base, a switch carried on said base,
a diaphragm positioned on said base to act on said switch,
an elongated temperature sensing device positioned in heat-receiving relationship with the heater,
said elongated temperature sensing device acting on said diaphragm to cause same to move in one direction to actuate said switch to one condition upon increase in temperature in said temperature sensing device,
one of said diaphragm and said switch being snap acting,
means including said diaphragm and said elongated temperature sensing device defining an enclosed chamber,
and a fillant of a heat expansible fluid under less than atmospheric pressure in said enclosed chamber with normal atmospheric pressure acting on one side of said diaphragm to normally maintain said diaphragm in the opposite direction to actuate said switch to the opposite condition 3. A thermostatic control device for an elongated heater, comprising a base, an electrical switch on said base,
a snap acting diaphragm positioned on said base to act on said switch,
an elongated temperature sensing device positioned in heat-receiving relationship with the heater throughout a majority of the length thereof,
said elongated temperature sensing device acting on said diaphragm to cause same to snap in one direction to actuate said switch to one condition upon increase in temperature in said temperature sensing device,
said elongated temperature sensing device including an elongated tube,
means including said diaphragm and said tube defining an enclosed chamber,
and a fillant of a heat expansible fluid under less than atmospheric pressure in said enclosed chamber at a predetermined normal temperature with normal atmospheric pressure acting on one side of said diaphragm to normally maintain said diaphragm in the opposite direction to actuate said switch to the opposite condition.

4. A thermostatic control for use with a heater or the like comprising, a thermostat housing,
switch contact means in said housing,
a snap-acting diaphragm in said housing movable to operate said switch contact means, said diaphragm having an inherent resilient bias toward one side thereof and being movable against said bias toward the opposite side thereof,
a support plate with a peripheral edge portion lying substantially in a plane,
an elongated capillary tube adapted to extend along the heater in heat-receiving relationship thereto and connected to said support plate in confronting relationship to the diaphragm at said opposite side thereof,
said support plate, diaphragm and tube together defining a closed, fluid-tight chamber with said support plate being bendable to adjust the temperature of snap action of said diaphragm,
and compressible and expandable heat-responsive fluid filling said chamber under partial vacuum at normal ambient temperatures with normal atmospheric pressure acting on one side of said diaphragm to normally maintain the diaphragm toward its said opposite side against said inherent bias,
said fluid being expandable by heat to permit said inherent bias to move the diaphragm toward its said one side.

5. A thermostatic control for use with a baseboard heater or the like comprising, a thermostat housing,
switch contacts in said housing,
a snap-acting diaphragm in said housing having a resilient self-bias which bows it toward one side thereof to disengage said switch contacts,
an elongated capillary tube adapted to extend in heat-receiving relationship to the heater along substantially the entire length of the latter, a support plate, said tube being closed at one end and having its opposite end connected to said support plate in confronting relationship to said diaphragm at the opposite side thereof,
said support plate, diaphragm and tube together defining a closed fluid-tight chamber extending substantially the entire length of the tube,
compressible and expandable heat-responsive fluid filling said chamber under partial vacuum at normal ambient temperatures with normal atmospheric pressure on one side of said diaphragm maintaining same bowed toward said opposite side thereof against its self-bias so as to permit said switch contacts to be engaged, said fluid being expandable by sufficient heat to permit the diaphragm to move under the influence of its self-bias toward said one side thereof to disengage said mobile contact from said fixed contacts,
and any leak occurring in said fluid tight chamber relieving said partial vacuum to cause said diaphragm to move under the influence of its self-bias to engage said switch contacts.

6. A thermostatic control for use with a heater comprising, a thermostat housing,
a pair of switch contacts in said housing, a snap-acting diaphragm in said housing at the opposite side of said contacts and having a resilient self-bias which bows it in a first direction toward said contacts, an elongated capillary tube adapted to extend in heat-receiving relationship to the heater along substantially the entire length of the latter, a flangeless support plate, said tube being closed at one end and having its opposite end connected to said support plate in confronting relationship to said diaphragm, said tube having a substantially uniform inside diameter throughout its length, said support plate, diaphragm and tube together defining a closed fluid-tight chamber extending substantially the entire length of the tube, said support plate in said fluid-tight chamber being bendable to adjust the temperature of snap action of said diaphragm, compressible and expandable heat-responsive fluid filling said chamber under partial vacuum at normal ambient temperatures and normally maintaining said diaphragm bowed toward said opposite side thereof against its self-bias by the action of atmospheric pressure on one side of said diaphragm so as to maintain said switch contacts engaged, said fluid being expandable by sufficient heat to permit the diaphragm to move in said first direction under the influence of its self-bias to disengage said switch contacts, and said diaphragm also being movable in said first direction to disengage said switch contacts in the event of a leak in said chamber establishing atmospheric pressure on both sides of said diaphragm.

References Cited by the Examiner

UNITED STATES PATENTS

| | | | |
|---|---|---|---|
| 1,781,289 | 11/1930 | Levy | 200—83 |
| 2,465,926 | 3/1949 | Queen et al. | 200—140 |
| 2,907,851 | 10/1959 | Moorhead et al. | 200—138 |
| 3,157,768 | 10/1964 | Ladd et al. | 200—138 |
| 3,205,329 | 9/1965 | Lindberg | 200—140 |
| 3,221,319 | 11/1965 | Lindberg | 200—140 X |

BERNARD A. GILHEANY, *Primary Examiner.*

H. M. FLECK, GREGORY J. MAIER,
*Assistant Examiners.*